United States Patent [19]

Hull

[11] 3,778,001
[45] Dec. 11, 1973

[54] SPINNING REEL

[76] Inventor: R. Dell Hull, 6101 E. Apache St., Tulsa, Okla. 74101

[22] Filed: Jan. 26, 1972

[21] Appl. No.: 220,755

[52] U.S. Cl............................................. 242/84.5 A
[51] Int. Cl............................................ A01k 89/02
[58] Field of Search................ 242/84.5 A, 84.51 A, 242/84.2 A, 84.21 A

[56] References Cited
UNITED STATES PATENTS

| | | | |
|---|---|---|---|
| 3,481,554 | 12/1969 | Hull | 242/84.2 A |
| 2,964,257 | 12/1960 | Hull | 242/84.2 A X |
| 3,023,978 | 3/1962 | Denison et al. | 242/84.5 A |
| 2,929,579 | 3/1960 | Hull | 242/84.2 A |
| 2,903,202 | 9/1959 | Sarah | 242/84.5 A |

Primary Examiner—
Assistant Examiner—Billy S. Taylor
Attorney—Hubert T. Mandeville et al.

[57] ABSTRACT

The disclosure herein relates to an improved "fine tuning" adjustment for a drag brake mechanism for heavy duty, closed face spinning reel assemblies of the type including a reel frame, a normally non-rotatable axially fixed line spool mounted on a cylindrical support projecting forwardly from the frame, and a spinner head carrying a pickup element mounted on a longitudinal main shaft supported in the frame for rotation about and displacement along a predetermined axis. Selectively predetermined, limited "drag" or rotation of the spool about its cylindrical support is accommodated through the controlled expansion and contraction of a series of split clutch rings. More specifically, the clutch rings are effectively increased in diameter by an eccentric cam actuator disposed between the split surfaces of the clutch rings, which actuator itself is uniquely, finely adjusted by a control member at the crank lever through means of a unique arrangement which applies the displacement of a jack screw to the eccentric actuator through a coil spring and lever arm mechanism. The jack screw is actuated through a two-gear train controlled by a star wheel supported on the reel crankshaft, adjacent the reel crank lever. The crankshaft, itself, drives the main shaft through appropriate gearing.

10 Claims, 4 Drawing Figures

PATENTED DEC 11 1973 3,778,001

3,778,001

SPINNING REEL

BACKGROUND AND SUMMARY OF THE INVENTION

The present invention relates generally to fishing reels and more particularly to improvements in drag brakes for heavy duty, closed face spinning reels of the type shown in Hull U.S. Pat. No. 3,481,554.

In one type of closed face spinning reel, a line carrying spool is normally non-rotatably mounted on a hub which projects forwardly from a reel frame. The line spool is axially fixed and normally non-rotatable; however, provision is made for limited rotary slippage or "drag" of the spool relative to the reel frame for controlled withdrawal of line from the spool. During casting, the line is drawn off and over the spinner head of the spool by the momentum of the lure and travels through a line guide in a cover generally surrounding the spool.

Retrieval of paid out fishing line may be effected in reels of this type by a spinner head mounted on a rotatable main shaft carried by the reel frame and driven by a crankshaft appropriately geared therewith. Advantageously, the spinner head of such a reel includes one or more selectively, radially projectable pickup pins carried at the periphery thereof. As is customary in spinner heads having projectable pickup pins, the reel mechanism may have a cam arrangement for accommodating projection or retraction of the pickup pins with respect to the periphery of the spinner head. Typically, the reel also includes a crank assembly to effect the necessary rotation of the main shaft to retrieve paid out line. Advantageously, a selectively actuatable antireverse mechanism is also included in the reel to prohibit rotation of the retrieval mechanism in a line pay out direction. A rearwardly disposed, thumb button-actuated line brake ring is arranged in a reel of the foregoing general description to snub the line against the rearmost edge of the spinner head preparatory to casting and also to displace the spinner head to a position in which the aforementioned pickup pins are retracted. This arrangement provides an advantageous sequential line braking-pickup pin retracting action in which the second action (pickup pin retraction) cannot possibly be effected until the first action (line braking) has been effected. A more complete understanding of a reel embodying such mechanism may be had from the aforementioned U.S. Pat. No. 3,481,554, the disclosure of which is incorporated by reference herein.

In accordance with the invention, the new and improved spinning reel includes an adjustable, "finely tunable" drag brake mechanism including a plurality of clutch elements in the form of C-shaped, resilient rings having integral shoes disposed in contact with the bore of the line spool and supported on the hub. Each C-ring is split at a shoe and a cam actuator is disposed in the split between opposite faces thereof. The cam actuator is arranged, upon rotation, to increase and decrease, respectively, the effective outer diameter of the C-rings carried on the hub, increasing and decreasing the frictional drag force applied to the spool by the shoes.

More specifically, very fine adjustment of the drag may be obtained through a linkage including a rotatable star wheel disposed on the crankshaft adjacent the crank lever. The linkage between the cam actuator and the star wheel includes a bent arm fixed to the actuator; a worm screw mounted proximate to the bent arm; a coil spring connecting the arm and the worm screw; a small spur gear having internal helical threads for translating the worm screw; and a large spur gear supported on the crankshaft and connected directly to the star wheel. Through the aforementioned linkage, comparatively large rotary displacements of the star wheel are geared down and resiliently transferred, as precise rotations of the eccentric cam actuator, to the split C-rings to effect "finely tuned" variations in the drag.

For a more complete understanding of the new and improved drag brake and its attendant advantages, reference should be made to the following detailed description taken in conjunction with the accompany drawings.

DESCRIPTION OF DRAWINGS

Initially referring to FIGS. 1 and 2, the new and improved fishing reel includes a cylindrical reel frame body 20 having a cylindrical hub 21 extending forwardly from its front face 22 and a boss 23 extending rearwardly from the back face 24. The reel frame includes an annular peripheral flange 25 which is adapted to be clamped between threaded front and rear generally cup-shaped cover members 10 and 11, respectively. As shown in FIG. 2, an annular end surface 12 of the front cover member and an annular end surface 13 of the rear cover member engage the opposite faces of the flange 25 to complete the reel assembly in the manner claimed and set forth in detail in U.S. Pat. No. 3,105,651, issued to R. Dell Hull. The front cover 10 includes a line guide 14 through which line L may be passed during casting and retrieving operations. The rear cover member 11 includes a pivotable thumb button 15.

Figure 1:
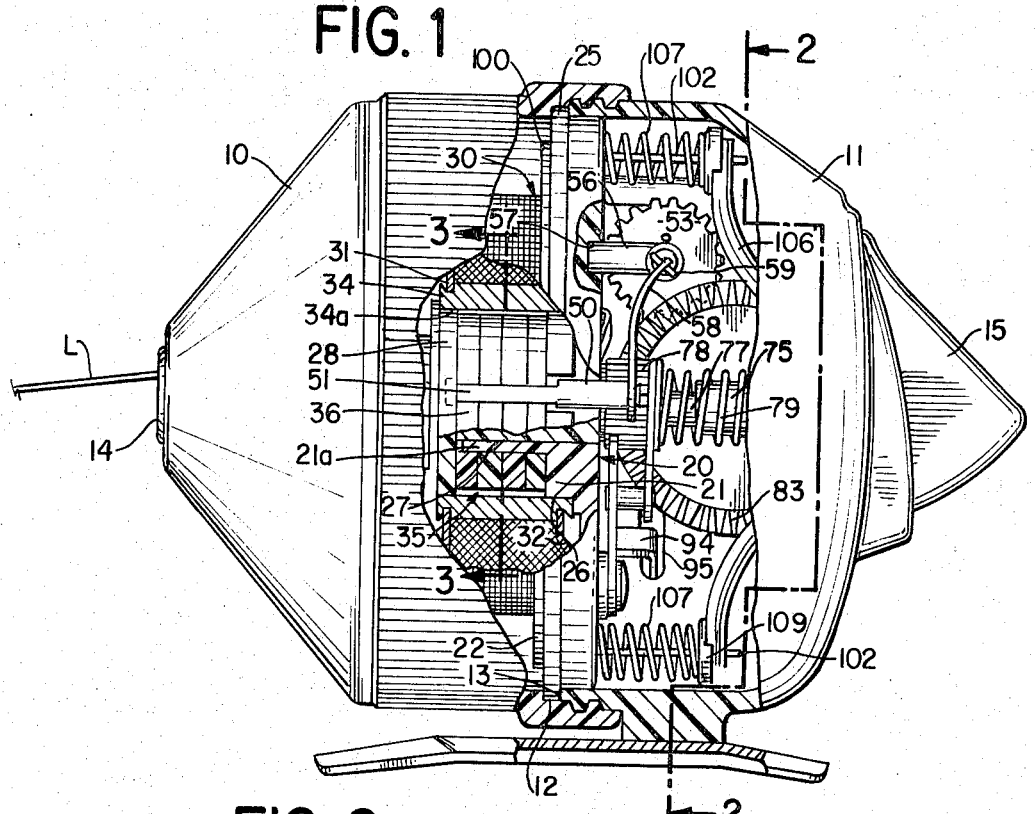
FIG. 1 is a side elevational view of a heavy duty, closed face spinning reel with parts broken away to show details of construction of the new drag brake mechanism.

In accordance with the invention, the forwardly projecting cylindrical hub 21, provides annular line spool supporting surfaces 26 and a reduced diameter portion 21a provides clutch ring support surfaces 27. A line spool 30 having front and back radial flanges 31, 32, respectively, and an arbor 34, is adapted to be seated on the surfaces 26 and on a spaced bearing element 28 in a normally non-rotatable, axially fixed manner to be described hereinafter.

Figure 2:
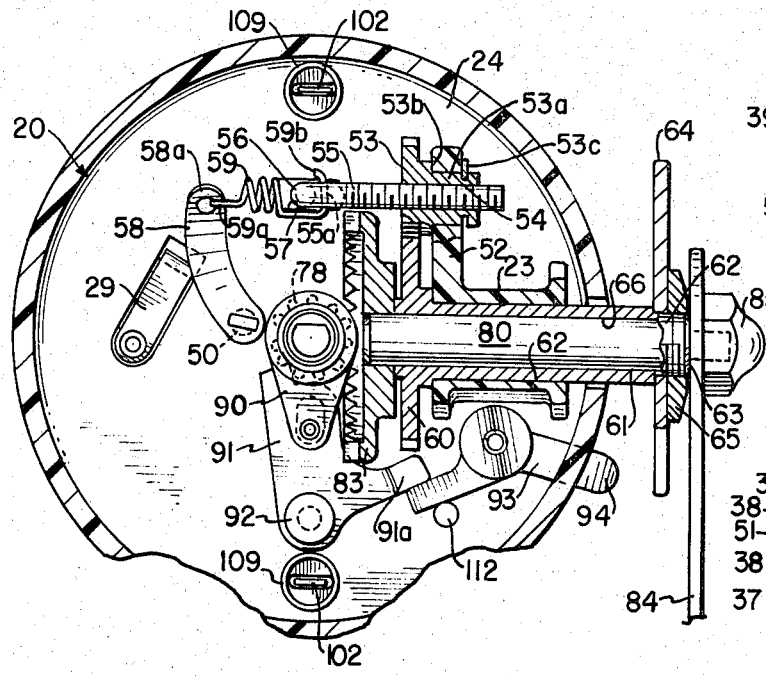
FIG. 2 is a cross-sectional view of the reel of FIG. 1 taken along line 2—2 thereof.
Figure 3:
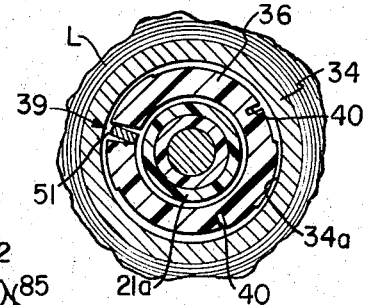
FIG. 3 is a cross-sectional view, taken along line 3—3 of FIG. 1, of the clutch rings of the invention in non-expanded or "no drag" position.

As shown best in FIG. 2, the hub 21 and an annular flange bearing element cooperate in defining an annular groove 35 in which four expandable clutch rings 36 are disposed. Each ring 36 comprises a "closed C-shaped" member made of resilient, flexible plastic material having integral diametrically opposed brake shoes 37 (FIG. 3). Each ring 36 includes opposed, spaced free edge portions 38 which define an actuating slot 39 (see FIGS. 3 and 4). As shown in the drawings, the slot 39 extends radially through the ring 36 and provides it with its C-shaped appearance. To provide the rings with an advantageous degree of flexion for the purposes of the invention, each is weakened in areas 120° from the actuating slot 39 by the formation of two slits 40. As will be appreciated, the slits 40 extend radially inwardly from the periphery of the retaining ring and accommodate spreading apart of the edges 38 to effectively increase the outer diameter of the ring. The brake shoe surfaces 37 are adapted to bear against spaced inner surface areas 34a of the normally non-rotatable spool arbor 34 with varying degrees of force to accommodate limited, controlled rotation of the spool about the hub surfaces 26. The spool is axially fixed with respect to the front face of the reel frame 20 by conventional means (not shown) such as a spring clip which may be snapped into the annular retaining groove formed in a hub extension (not shown).

Figure 4:
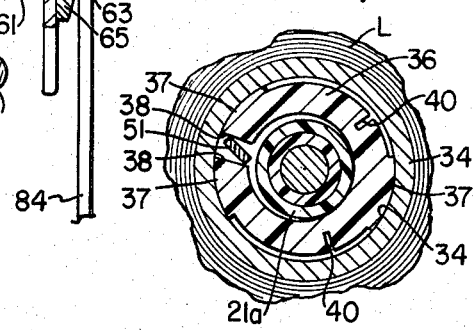
FIG. 4 is a cross-sectional view of the clutch rings in an expanded or "adjusted drag" position.

In accordance with the invention, the C-ring clutch elements 36 are expanded through a clutch shaft 50 which extends axially through the reel frame and into the actuating slots 39 of the rings 36. The actuating member includes an effectively eccentric portion 51 (with respect to actuating slot 39) having an oblong cross section. As will be understood, when the long sides of the eccentric portion 51 are generally aligned with the edges 38 of the retainer ring, as shown in FIG. 3, the ring will be in its non-expanded position. However, as the eccentric portion is rotated, it will tend to increase gradually the gap between the opposed surfaces 38, as shown in FIG. 4. This, of course, expands the rings 36 and forces the shoes 37 against the spool bore surfaces 34a and thereby increases the "drag" or the resistance to slippage of the spool arbor 34 about the hub surfaces 26. The use of four or more clutch elements 36 is especially important in heavy duty reels where a large amount and wide range of drag braking capacity is desired.

In accordance with the invention, the boss 23 includes an integral extension 52 which journals a stub shaft 53a having an integral spur gear 53 formed thereon. The element 53 is held in place by a shoulder 54b and a clip 53c disposed in an annular groove, as shown in FIG. 2. Included in the spur gear element 53 are internal helical threads 54 which engage a jack screw or worm screw 55 supported therein. The innermost end 56 of the jack screw is bent and disposed axially of the reel in a slot 57 formed in the rear face of the frame 20. A cantilever 58 is fixed to the rearward end of the cam actuator shaft 50 which is mounted for rotation in the reel frame 20, as shown in FIG. 2. The free end of the cantilever 58 is directly connected to the inner end of the screw 55 by a tightly wound spring 59. Specifically, bent spring ends 59a, 59b are inserted into holes 58a, 55a, respectively, of the cantilever 58 and screw 55. In this manner, rotation of the jack screw will be substantially prohibited, and its translation will cause the cantilever 58 to be pivoted through the spring 59, which spring advantageously accommodates a slight degree of overtravel, as will be understood. The edges of the slot 57 will, of course, limit the travel of the jack screw by limiting the displacement of the bent end 56 of the screw 55 disposed in the slot 57.

The small spur gear 53 is driven by a large spur gear 60 (gear ratio of approximately 2:1) having an outwardly extending integral, hollow shaft 61 which is supported for rotation in a bore formed in the boss 52. The shaft 61 has flats 62 formed on the reduced threaded outer end 63 thereof. A star wheel 64 is non-rotatably keyed to the flats 62 and is secured firmly to the shaft by an appropriate lock nut 65. The bore 66 of the shaft 61 is adapted to support a crankshaft 80 therein for independent rotation.

The selective, controlled, rotation of the star wheel 64, in either direction, will rotate the gear 60 which in turn will rotate the gear 53, which in turn will translate the worm 55 inwardly or outwardly of the reel. The translation of the jack screw 55 will, through its spring connection to the arm 58, rotate the cam actuator 50 and hence increase or decrease the effective diameters of the C-ring clutch elements 36. As will be appreciated, as the diameters of the C-rings increase, the force applied by the integral brake shoe elements 37 against the spool surfaces 34a will be increased, hence the resistance to rotation or amount of drag will be increased. Conversely, when the cam actuator 50 is in the position shown in FIG. 3, the brake shoe elements will tend to be withdrawn from the surfaces 34a and the drag imparted thereby will be reduced. Advantageously, a drag alarm consisting of a spring pawl 29 bearing against serrations on the rear flange of the spool is established in the reel and it is sounded when the spool 30 slips about the hub surfaces 26.

A main shaft 75, carrying the spinner head (not shown) at its forward end, is supported in a center bearing for both rotation and limited axial displacement. Specifically, the shaft 75 is stepped and its smaller diameter rear portions are provided with a flat 77, to which a spur gear 78 is slidably keyed. The main shaft 75 is provided with a constant rearward bias by a compression spring 79 which acts between the rear face of the gear 78 and a flanged spacer element (not shown) which itself bears against a spring clip (not shown) secured to the rearmost portion of the center shaft.

Rotary motion for line retrieval is imparted to the center shaft through rotation of the crank 80 attached to a crankshaft 82 which is mounted for rotation in the bore 66 of the shaft 60. As shown in FIGS. 1 and 2, the crankshaft mounts a bevel gear 83 at its inner end which meshes with the spur gear 78 to drive the main shaft 75. A crank lever 84 is attached to the outer end by a nut 85 for manual rotation of the shaft 80.

Associated with the driving gear train of the reel is an anti-reverse mechanism comprising a pivotable anti-reverse actuator 90 maintained in frictional face-to-face contact with a rear surface of the spur gear 78 and an anti-reverse pawl element 91 supported at the back surface of the reel frame 20 by a rivet 92. Selective operation of the pawl 91 is effected through an anti-reverse control element 93 having a lever portion 94 projecting through a slot 95 formed in the rear cover 11.

When it is desired to prohibit reverse rotation of the retrieval mechanism, positioning of the control lever 94 in the "on" position against a post 112 will allow the anti-reverse element 91 to be driven through the actuator element 90 into blocking engagement with the gear 78. Of course, the anti-reverse element 91 may be disengaged, i.e., it may be turned "off" by pivoting the lever 94 to a lower position in which the leg 91a of the element 91 is held in a non-blocking relation with the rear 78. Anti-reverse mechanisms of this general type are described in more detail and claimed in R. Dell Hull U.S. Pat. No. 3,489,365.

A line brake with a brake ring 100 of rubber is supported by spaced legs 102 extending through slots in the reel frame. The brake ring is given rearward bias by compression springs 107 which surround the legs 102 and act between circular recesses formed in the back face of the reel frame and annular washers 109. As shown in FIG. 1, the completed brake ring assembly includes a bar 106 and will be urged rearwardly of the reel by the springs 107. A central portion of the actuating bar contacts the thumb button 15 and urges it to its rearwardmost position.

The new and improved reel is prepared for casting by depressing the thumb button 15, which operation will initially, forwardly displace the brake ring 100 against the rear edges of the spinner head to securely clamp the line therebetween. As the reel is swung forward on the fishing pole, thumb pressure is maintained on the button 15 to keep the line braked until the instant that payout is desired. Release of thumb pressure will cause the brake ring 100 to be automatically withdrawn from the spinner head under the influence of the compression springs 107. While the line is being drawn off the spool under the forward momentum of the cast lure, the spinner head and the main shaft will be locked in a forwardmost position by elements associated with the spinner head and described and illustrated in greater detail in my earlier U.S. Pat. No. 3,481,554.

Retrieval of the line is effected simply and efficiently in known manner by rotating the main shaft through the aforementioned crank, bevel gear and spur gear arrangement. During line retrieval or while the line is paid out, excessive forces may be exerted on the line by a hooked fish, a snagged object, or the like. As should be appreciated, through the "finely tuned" control of the clutch elements 36, limited, finitely controlled slippage or rotation of the spool 30 about the hub surfaces 26, and concomitant line payout will be effected in order to prevent the excessive load from breaking or unduly straining the line as would otherwise be the case. As a further important aspect of the present invention, the "drag" of the spool relative to the reel frame is easily and rapidly, precisely adjusted through the new and improved rotatable star wheel-jack screw mechanism to increase or to decrease the brake shoe pressure and hence the resistance to slippage of the spool arbor 34.

It should be understood that the specific spinning reel structure herein illustrated and described is intended to be representative only, as certain changes may be made therein without departing from the clear teachings of the disclosure. Accordingly, reference should be made to the following appended claims in determining the full scope of the invention.

I claim:

1. In a heavy duty, closed face spinning reel including a reel frame and a normally non-rotatable line spool having a cylindrical bore of predetermined diameter mounted on a cylindrical support projecting forwardly from said frame, an improved drag brake mechanism comprising
   a. a plurality of generally annular clutch rings disposed between said spool bore and said cylindrical support;
   b. said rings having radially extending slots therein to give said rings generally closed C-shapes;
   c. a clutch shaft supported in said reel frame for rotation about an actuator axis passing through said slot;
   d. said shaft having eccentric actuating surfaces formed on the forward end thereof and disposed in said slot;
   e. a cantilever means fixed to the rearward end of said actuator shaft;
   f. boss means integral with said reel frame projecting rearwardly therefrom and defining first and second parallel bores therein;
   g. a first spur gear having internal helical threads supported for rotation by integral shaft means disposed in said first bore;
   h. a worm screw supported in said spur gear for displacement perpendicularly thereof;
   i. a second spur gear, meshing with said first gear, supported on a second shaft means disposed in a second bore in said boss means;
   j. a control element fixed to the outer end of said second shaft means and being adapted to rotate the same;
   k. a tightly wound coil spring means connecting the inner end of said worm screw with said cantilever means;
   l. whereby rotation of said control element will effect controlled displacement of said worm screw which will move said cantilever means, through said spring, to rotate said eccentric actuating surfaces in said slot to vary the diameters of said clutch rings.

2. A reel in accordance with claim 1, in which
   a. said cylindrical support for said line spool includes an integral hub projecting forwardly from said reel frame body and having an outer diameter approximately equal to the bore diameter of said line spool;
   b. said hub having an annular reduced diameter portion formed forwardly thereof definitive of a clutch ring support surface;
   c. annular flange means having an outer diameter approximately equal to the bore diameter of said line spool and being disposed proximately of the forward end of said reduced diameter portion;
   d. said flange means and said hub cooperating to define an annular seat for said clutch rings.

3. A reel in accordance with claim 1, in which said reel includes at least four clutch rings.

4. A reel in accordance with claim 1, in which each of said clutch rings includes at least two integral brake shoe means.

5. A reel in accordance with claim 4, in which each of said slots intersects one of said brake shoe means.

6. A reel in accordance with claim 1, in which
   a. each of said clutch rings includes two slits disposed approximately 120° from said slot to enhance the flexibility of said ring;
   b. said rings are formed of high fatigue strength material.

7. A reel in accordance with claim 1, in which
   a. said second shaft means is hollow;
   b. a crankshaft having a crank lever at its outermost end is supported in said second shaft means;
   c. said crankshaft is geared to a reel main shaft for rotating the same.

8. A reel in accordance with claim 7, in which said control element is a star wheel disposed immediately adjacent to said crank lever.

9. A reel in accordance with claim 1, in which said coil spring includes bent end portions connected to openings formed in each of said cantilever means and said worm screw.

10. A reel in accordance with claim 1, in which said second spur gear is substantially larger than said first spur gear.

* * * * *